United States Patent [19]

Reedy

[11] Patent Number: 4,900,237

[45] Date of Patent: Feb. 13, 1990

[54] ROLLING ROTOR MOTOR BALANCING MEANS

[75] Inventor: Wayne R. Reedy, Monticello, Ind.

[73] Assignee: Carrier Corporation, Syracuse, N.Y.

[21] Appl. No.: 266,425

[22] Filed: Nov. 2, 1988

[51] Int. Cl.$^4$ .............................................. F04B 17/00
[52] U.S. Cl. .................... 417/356; 74/573 R; 310/81; 310/89; 366/128; 418/151
[58] Field of Search .................... 310/81, 91, 89, 80, 310/51; 128/34, 35, 36; 74/573 R, 61, 87, 573 F, 574; 366/128; 464/170; 417/355, 356; 418/151

[56] References Cited

U.S. PATENT DOCUMENTS

| | | | |
|---|---|---|---|
| 2,480,825 | 9/1949 | Adolph | 310/81 |
| 2,561,890 | 7/1951 | Stoddard | 417/353 |

FOREIGN PATENT DOCUMENTS

| | | | |
|---|---|---|---|
| 0230057 | 12/1958 | Australia | 310/81 |
| 0022553 | 3/1981 | Japan | 310/81 |
| 0158126 | 3/1957 | Sweden | 310/81 |

Primary Examiner—R. Skudy
Attorney, Agent, or Firm—David J. Zobkiw

[57] ABSTRACT

A rolling rotor motor/compressor has a stator/cylinder with an internal rotor/piston. The stator/cylinder and rotor/piston together define a chamber and a vane extends into this chamber when the device is compressor. The rotor/piston has a pair of axially extending shafts and a pair of counterweights coact with the shafts for balancing while permitting radial movement of the rotor/piston within the stator/cylinder. This permits unloading of the compressor such as when there is a liquid slug.

6 Claims, 7 Drawing Sheets

ON AT OFF

ON BEFORE OFF

ROLLING ROTOR MOTOR BALANCING MEANS

BACKGROUND OF THE INVENTION

A rolling rotor motor is one in which only a portion of the windings are activated at any given time and the resultant asymmetric magnetic field is moved around the stator by changing which ones of the windings are the activated windings. This type of motor is characterized by high torque and low speed. Where the rotor is located internally of the stator, the coaction between the rotor and stator as a result of the asymmetric magnetic field, unless otherwise limited, is like that of the piston and cylinder of a rolling piston or reciprocating vane type compressor. As a result, the rotor may also be the piston of a rolling piston compressor such as is disclosed in U.S. Pat. No. 2,561,890. Since the rotor rolls around the stator, there are low bearing loads as compared to a motor in which the rotor is constrained to rotate about a fixed axis.

The rolling rotor motor can be integral with the compressor thereby reducing the size and number of parts such as shafts and bearings, but it has some inherent disadvantages. Because only some of the windings are activated at any particular time, the output torque per pound of motor weight is less than it would be for an induction motor. Also, the rotor is dynamically unbalanced since its center traces a circular orbit as it moves circumferentially towards the activated windings due to magnetic attraction as it follows the rotating field. The unbalance forces increase with the square of the rotor speed thus making the motor unsuitable for high speed applications.

SUMMARY OF THE INVENTION

A short axial shaft is provided on each end of the rolling rotor and serves as a bearing surface for mounting a counterweight. Short shafts on the end frames serve to constrain the counterweights so that their masses are always located diametrically opposite the rotor mass relative to their rotational center line defined by the short shafts on the end frame. The drive for each of the counterweights is a pin in a slot, so that the counterweights maintain angular alignment. However, the rotor is free to change its radius of operation such as rolling over foreign material on the inside of the stator or a liquid slug when used as a compressor.

It is an object of this invention to dynamically balance a rolling rotor motor/compressor.

It is another object of this invention to provide counterbalance weights which are simple to apply and which do not restrict the action of the rolling rotor.

It is further object of this invention to permit the rolling rotor to change its radius of operation. These objects, and others as will become apparent hereinafter, are accomplished by the present invention.

Basically, the center of the rotor of a rolling rotor motor and a counterweight are located on diametrically opposite sides of the short shafts on the end frame. The rotor alone or the rotor and counterweight are able to move radially to change their rotation arm and thereby accommodate foreign/incompressible material at the point of contact between the rotor and stator.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
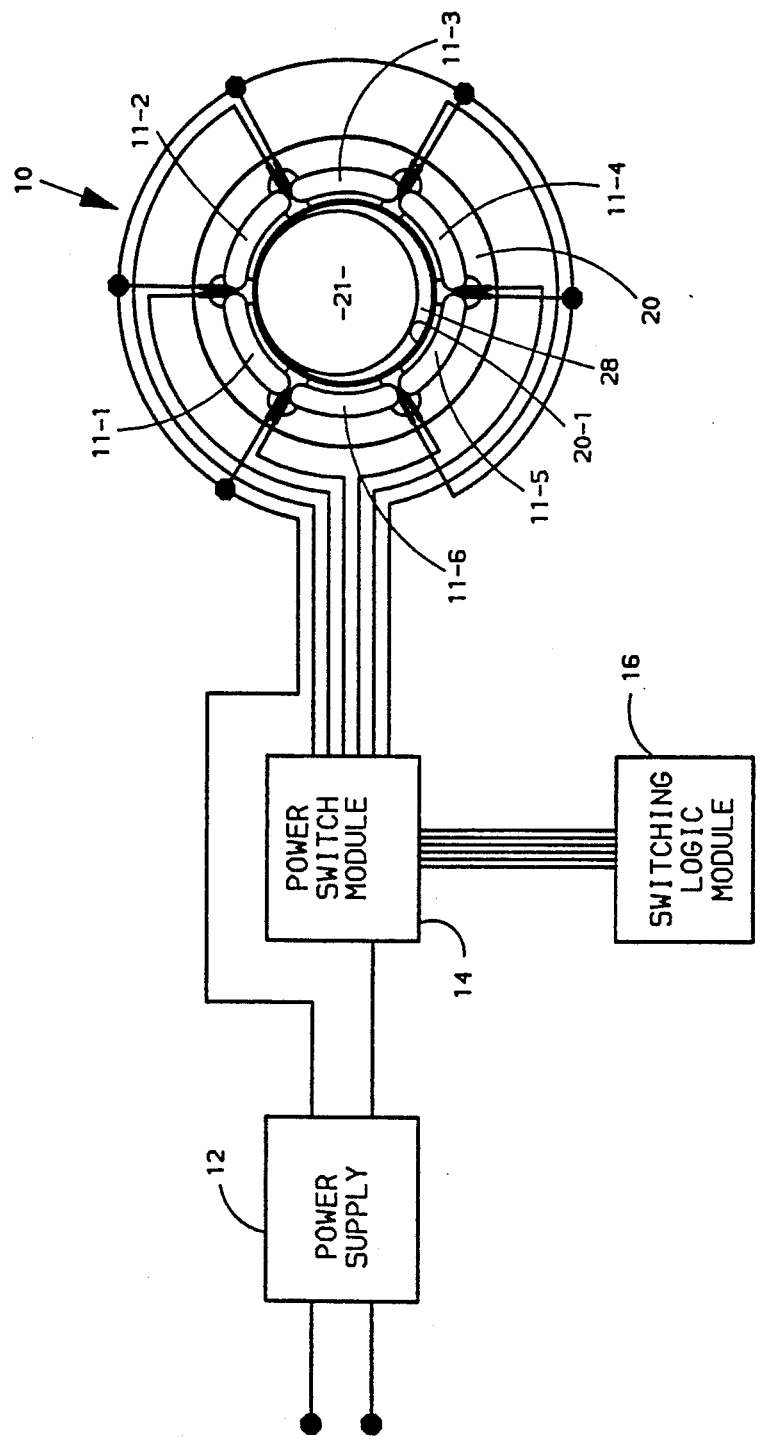
FIG. 1 is a circuit diagram for a rolling rotor motor/compressor.
Figure 2:
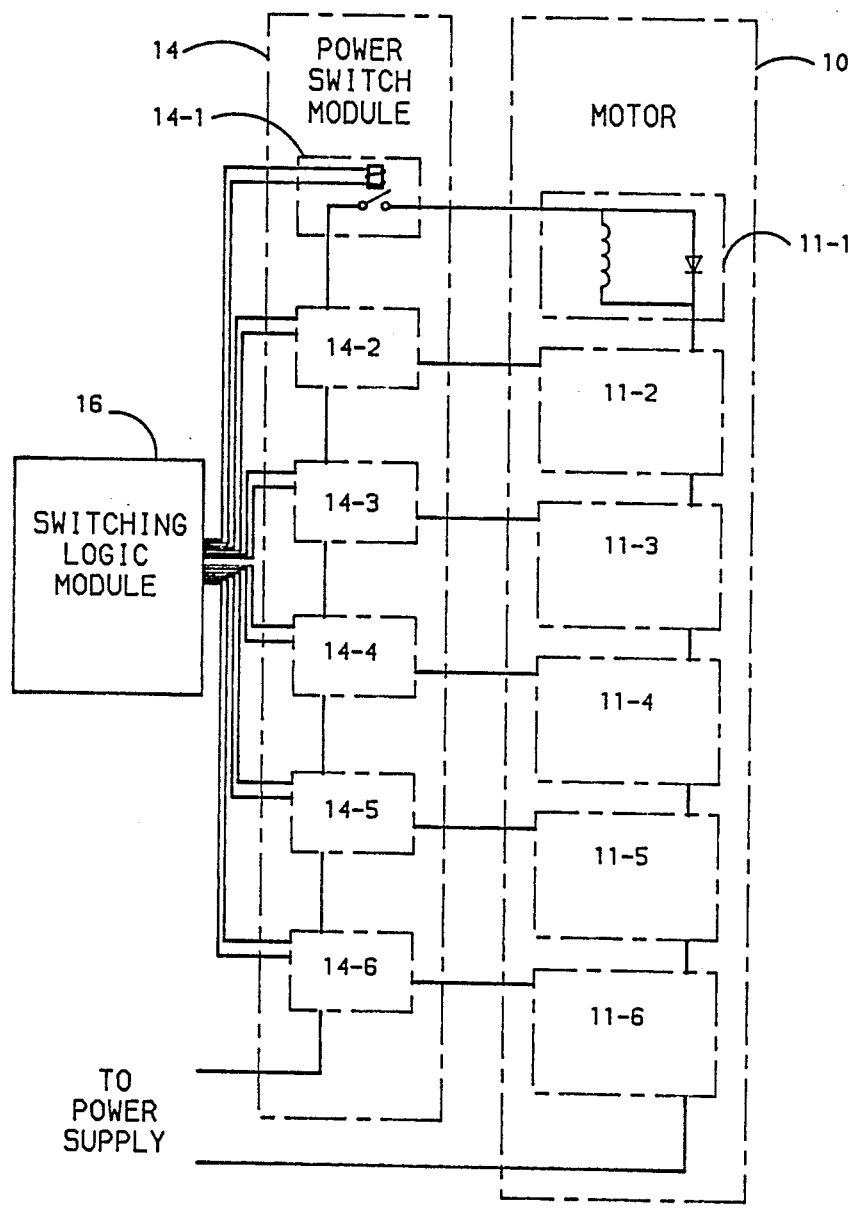
FIG. 2 is a more detailed view of the switching portion of the circuit of FIG. 1.
Figure 3:
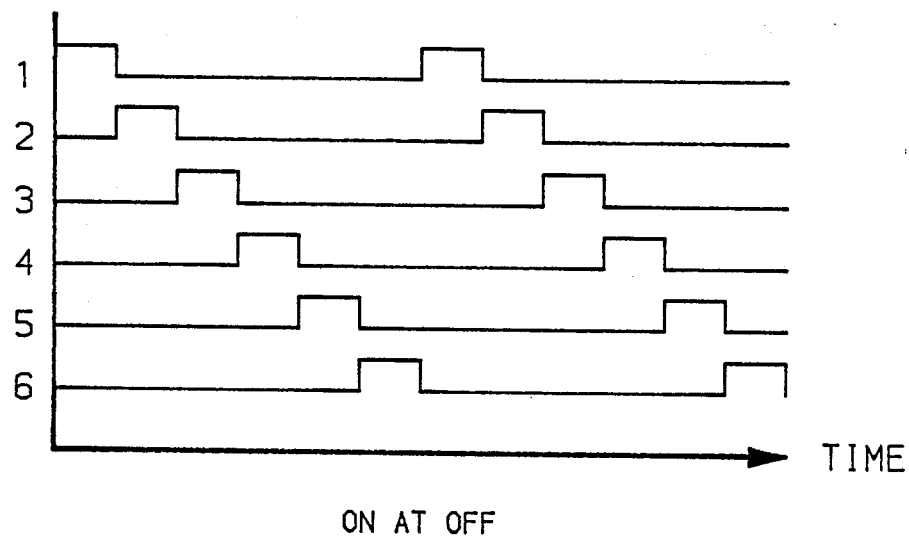
FIG. 3 is a graph showing the actuation of the switches as a function of time in the on at off mode.
Figure 4:
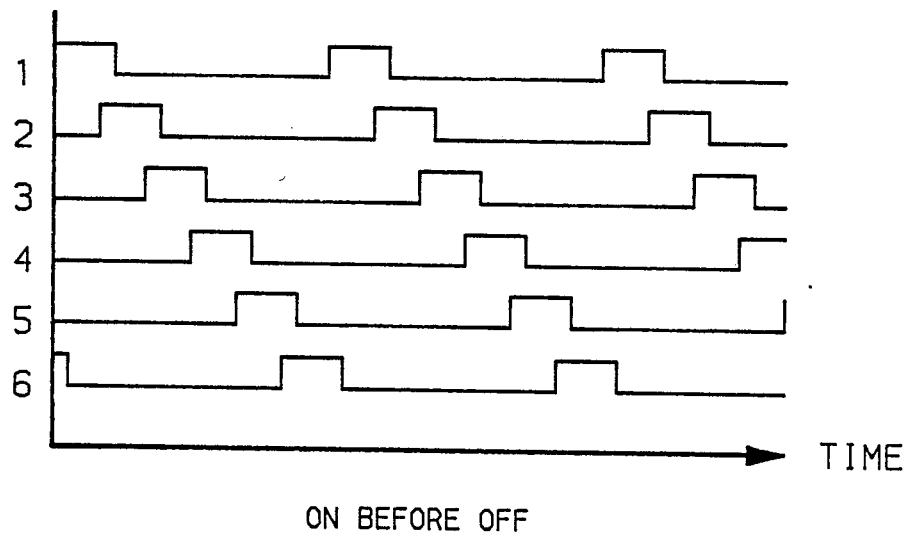
FIG. 4 is a graph showing the actuation of the switches as a function of time in the on before off mode.

In FIG. 1 the numeral 10 generally designates a rolling rotor motor/compressor which has a plurality of windings with six, 11-1 to 6, being illustrated. Power from power supply 12 is supplied to windings 11-1 to 6 by power switch module 14 under the control of switching logic module 16. Referring to FIG. 2, it will be noted that the power supply 12 is connected to windings 11-1 to 6 through switches 14-1 to 6 which are controlled by switching logic module 16. Switch 14-1 is illustrated as solenoid actuated but any suitable power switching may be employed. Switches 14-1 to 6, as illustrated in FIG. 3, can be actuated in an "on at off" mode wherein the shutting off of power to one winding coincides with the supplying of power to the next winding. Alternatively, as illustrated in FIG. 4, switches 14-1 to 6 can be actuated in an "on before off" mode wherein power is supplied to a winding for a short period of time after power is supplied to the next winding.

Figure 5:
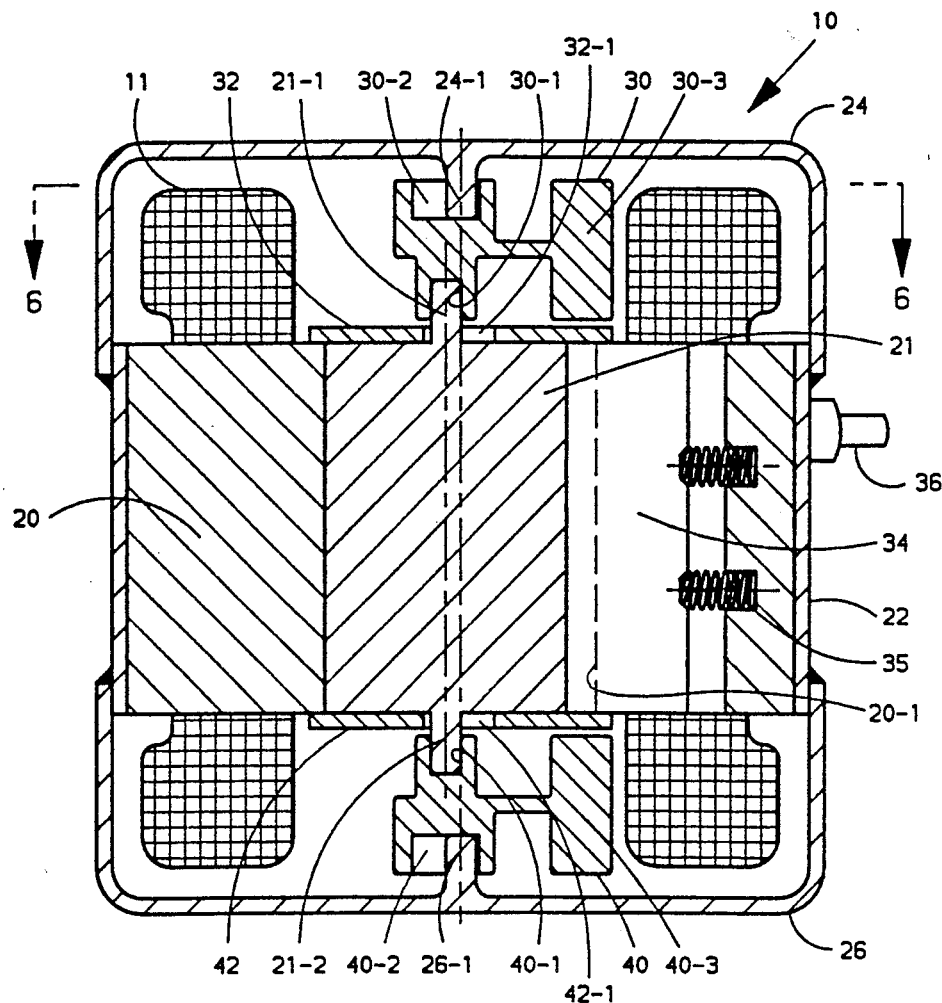
FIG. 5 is a vertical section of a rolling rotor motor/compressor taken along line 5—5 of FIG. 6.
Figure 6:
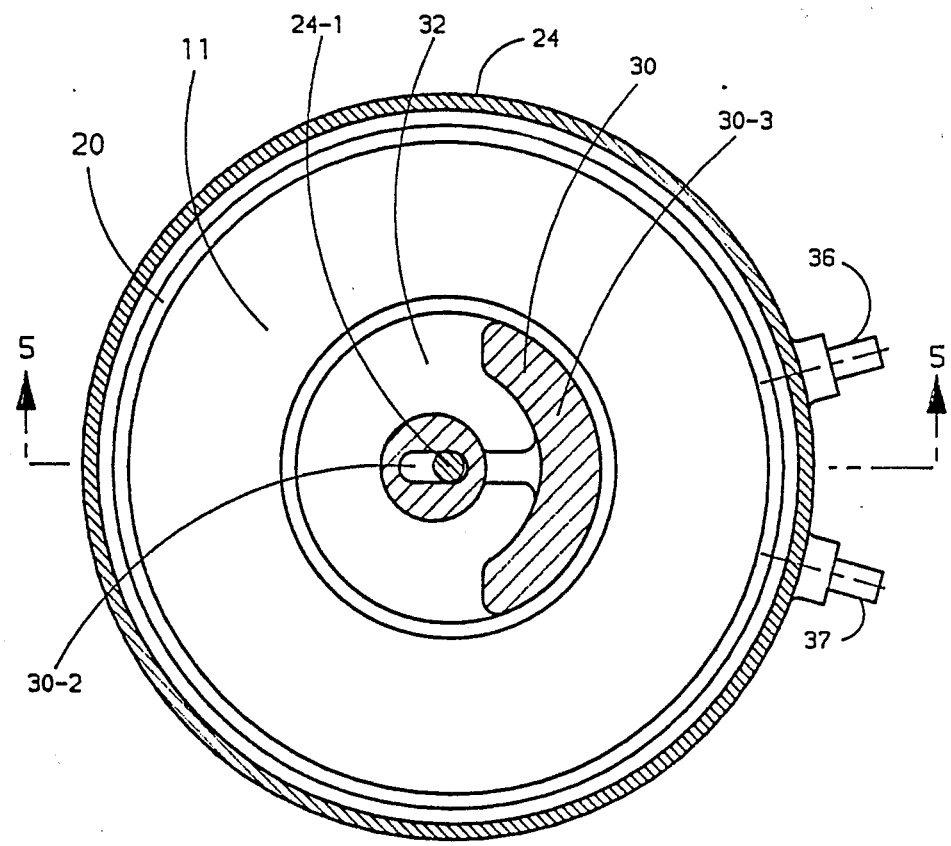
FIG. 6 is a horizontal section taken along line 6—6 of FIG. 5.

In FIGS. 1, 5 and 6 the numeral 10 generally designates a rolling rotor motor/compressor which includes a stator 20 with a base 20-1 and windings 11, and a rotor/piston 21 having short axial shafts 21-1 and 2. Rotor/piston 21 and bore 20-1 together define a lunette shaped space or chamber 28 during operation. Space or chamber 28 defines the air gap of the motor and the suction and/or discharge chamber of the compressor. Short shafts 21-1 and 2 are rotatably received in bores 30-1 and 40-1, respectively of counterweights 30 and 40. End frames 24 and 26 define the top and bottom, respectively, of hermetic shell 22 and have axial shafts 24-1 and 26-1 and provide a chamber for counterweights 30 and 40, respectively. Axial shafts 24-1 and 26-1 coact with slots 30-2 and 40-2 to provide a pivot for the rotor 21 and counterweights 30 and 40 while permittinq radial movement of the rotor 21 and counterweights 30 and 40 as a unit.

In operation, as the magnetic field moves about the stator 20 through the selective activation of some of the windings, as described above, rotor/piston 21 tends to follow the magnetic field and coacts with the base 20-1 of stator 20 in the manner of the coaction of the piston and cylinder of a rolling piston compressor. The rotor/piston 21 thus rotates about the coaxial axes of shafts 21-1 and 2 while the rotor/piston 21 and counterweights 30 and 40 rotate as a unit about coaxial axes of shafts 24-1 and 26-1. Since the weight portions 30-3 and 40-3 are on the opposite side of shafts 24-1 and 26-1 from the center of gravity of rotor/piston 21, the unit can be dynamically balanced with the correct selection or design of the counterweights 30 and 40 using standard moment of inertia equations to balance the rotor/piston 21 with the counterweights 30 and 40. Since the gas loads change with the compression process, there will be unbalance at some time since the counterweights do not accommodate these changes. However, the initial selection of the counterweight can chose some stage of the compression stroke at which balance is established. If a liquid slug, for example, was in the trapped volume of the compressor, its incompressibility would create an excess pressure. Because slots 30-2 and 40-2 are provided, rotor/piston 21 can move away from the wall of base 20-1 of stator 20 thereby unsealing the trapped volume and permitting the rotor/piston 21 to override the liquid slug, grit, etc.

For compressor operation, it is necessary to close the ends of the chamber 28 defined between stator 20 and rotor 21 and to provide a vane or blade 34. The closing of the chamber 28 is achieved by plates 32 and 42 which are sealingly attached to the stator 20 by any suitable means such as welding or bolting. Plates 32 and 42 have circular openings 32-1 and 42-1 which receive shafts 21-1 and 2. Plates 32 and 42 remain stationary and in sealing contact with rotor 21 which rotates due to the changing magnetic field. Vane 34 is biased against rotor/piston 21 by springs 35 and coacts therewith to normally divide chamber 28 into a suction chamber and a compression chamber. On a transitory basis, chamber 28 may be only a suction chamber of a compression chamber. Refrigerant at suction pressure is supplied from the refrigeration system (and illustrated) via line 36 and refrigerant at discharge pressure is suppled to the refrigeration system (not illustrated) via line 37 in the conventional manner for a rolling piston compressor.

Figure 7:
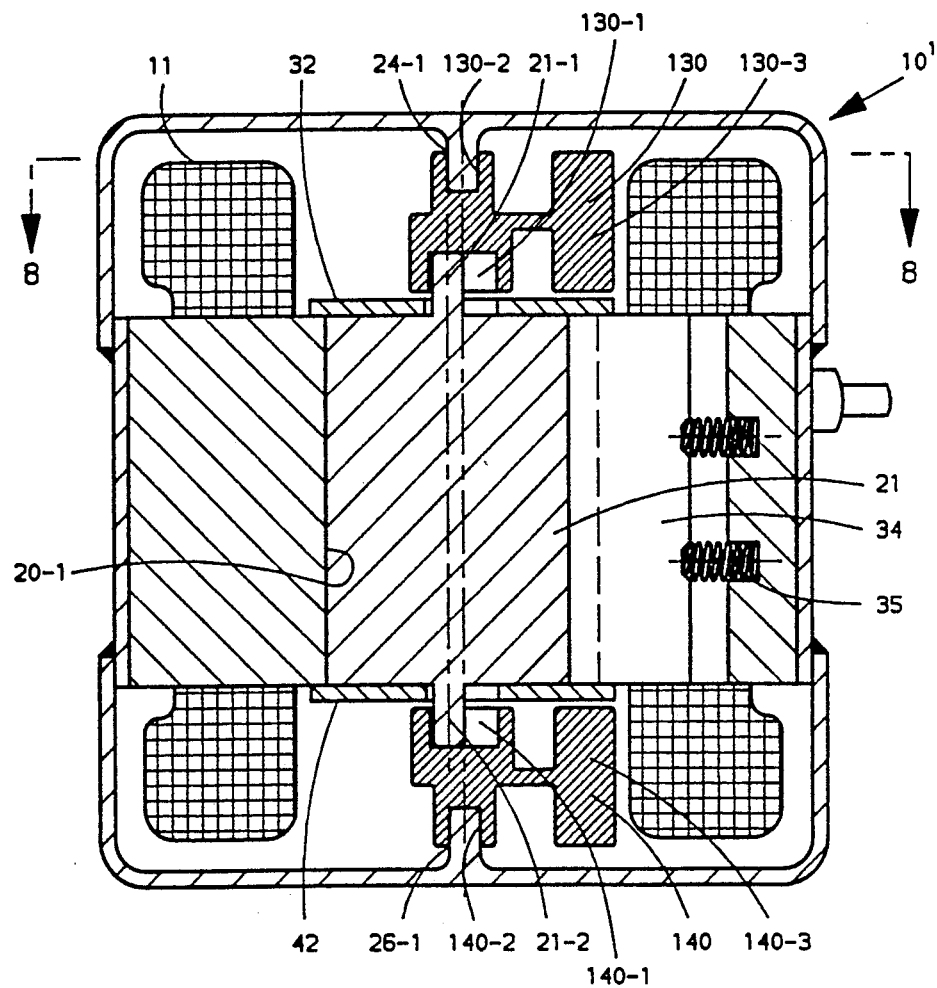
FIG. 7 is a vertical section of a modified rolling rotor motor/compressor taken along line 7—7 of FIG. 8.
Figure 8:
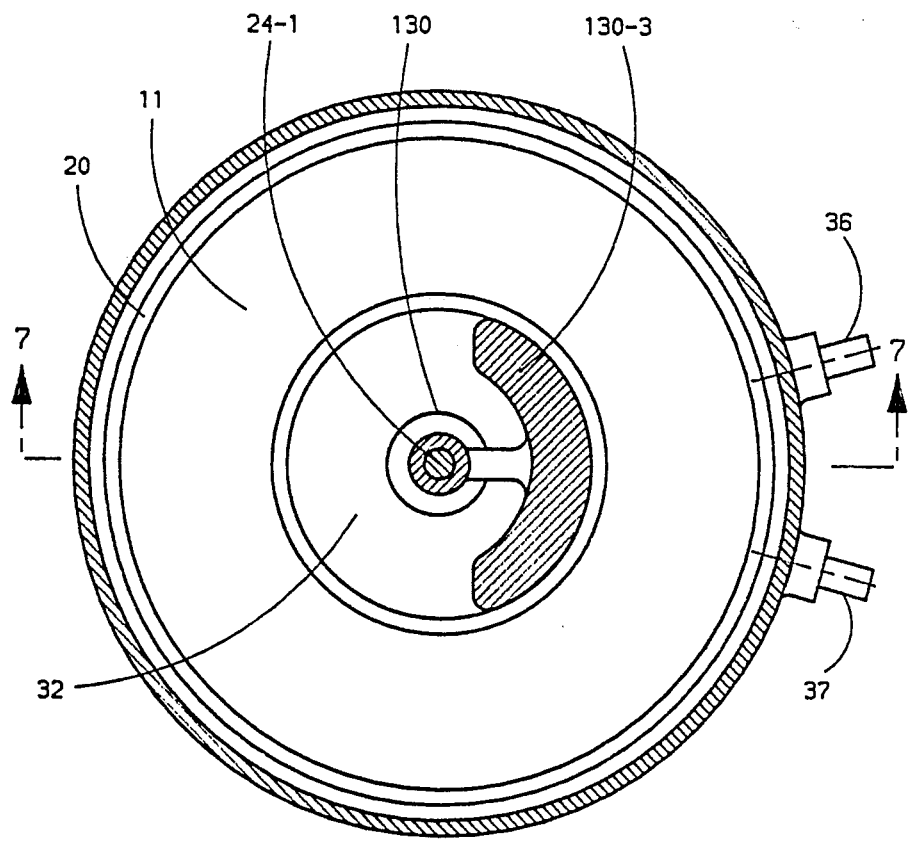
FIG. 8 is a horizontal section taken along line 8—8 of FIG. 7.

The rolling rotor motor/compressor 10' of FIGS. 7 and 8 is structurally identical to the rolling rotor motor/compressor 10 of FIGS. 1-6 except in the details of counterweights 130 and 140. The counterweights 30 and 40 do not have a fixed axis of rotation whereas counterweights 130 and 140 do. Specifically, counterweights 130 and 140 have bores 130-2 and 140-2 which receive and rotate about axial shafts 24-1 and 26-1. Short shafts 21-1 and 2 are received in slots 130-1 and 140-1 which permit radial movement of rotor/piston 21 without requiring movement of weight portions 130-3 and 140-3 rather than radial movement of both the rotor/piston 21 and the counterweights 30 and 40 as in the case of motor/compressor 10.

Although preferred embodiments of the present invention have been illustrated and described, other changes will occur to those skilled in the art. It is therefore intended that the scope of the present invention is to be limited only by the scope of the appended claims.

What is claimed is:

1. A rolling rotor motor means comprising:
  housing means;
  stator means within said housing means and having a plurality of windings and a cylindrical opening therein;
  said housing means having a pair of shafts axially spaced from said cylindrical opening and coaxial therewith;
  cylindrical rotor means located within said cylindrical opening and defining therewith a chamber;
  said rotor means having a pair of axially extending shafts;
  a pair of counterweight means each coacting with one of said pair of shafts of said housing means and a corresponding one of said pair of shafts of said rotor means whereby said pair of counterweight means and said rotor means move as a unit responsive to the sequential actuation of said plurality of windings.

2. The rolling rotor motor means of claim 1 wherein each of said counterweight means has a first opening for receiving one of said pair of shafts of said housing means and a second opening for receiving a corresponding one of said pair of shafts of said rotor means.

3. The rolling rotor motor means of claim 2 wherein said second opening is a slot for permitting radial movement of said rotor means and said counterweight means rotate about said pair of shafts of said housing means.

4. The rolling rotor motor means of claim 3 further including vane means extending into said chamber whereby said rolling rotor motor means is also a rolling rotor compressor.

5. The rolling rotor motor means of claim 2 wherein said first opening is a slot for permitting radial movement of said rotor means and said counterweight means as a unit.

6. The rolling rotor motor means of claim 5 further including vane means extending into said chamber whereby said rolling rotor motor means is also a rolling rotor compressor.

* * * * *